United States Patent
Aldrich et al.

(10) Patent No.: US 8,756,267 B1
(45) Date of Patent: *Jun. 17, 2014

(54) DUAL-MULTIPLY-ACCUMULATOR OPERATION OPTIMIZED FOR EVEN AND ODD MULTISAMPLE CALCULATIONS

(75) Inventors: Bradley Aldrich, Austin, TX (US);
Nigel C. Paver, Austin, TX (US);
William T. Maghielse, Austin, TX (US)

(73) Assignee: Marvell International Ltd. (BM)

( * ) Notice: Subject to any disclaimer, the term of this patent is extended or adjusted under 35 U.S.C. 154(b) by 289 days.

This patent is subject to a terminal disclaimer.

(21) Appl. No.: 13/285,830

(22) Filed: Oct. 31, 2011

Related U.S. Application Data (63) Continuation of application No. 12/042,100, filed on Mar. 4, 2008, now Pat. No. 8,051,121, which is a continuation of application No. 10/826,459, filed on Apr. 16, 2004, now Pat. No. 7,353,244.

(51) Int. Cl.
*G06F 17/10* (2006.01)

(52) U.S. Cl.
USPC .......................... 708/319; 708/523; 708/524

(58) Field of Classification Search
USPC .................................................. 708/300–323
See application file for complete search history.

(56) References Cited

U.S. PATENT DOCUMENTS

| | | | |
|---|---|---|---|
| 4,344,149 A | 8/1982 | van de Meeberg et al. |
| 4,817,025 A | 3/1989 | Asai et al. |
| 5,258,939 A | 11/1993 | Johnstone et al. |
| 5,515,402 A | 5/1996 | Chester |
| 6,442,580 B1 | 8/2002 | Machida |
| 2002/0010728 A1 | 1/2002 | Stoye |
| 2003/0055861 A1 | 3/2003 | Lai et al. |
| 2003/0069913 A1 | 4/2003 | Deng et al. |
| 2004/0034760 A1 | 2/2004 | Paver et al. |

*Primary Examiner* — Tan V. Mai (57) ABSTRACT

According to some embodiments, a device is configured to perform a dual multiply-accumulate operation. In one embodiment, the device includes a functional unit configured to calculate, in parallel, a first multiplication product of a first coefficient and a first sample; and a second multiplication product of the first coefficient and a second sample. The first sample is an (n)th sample and the second sample is an (n+2)th sample in a plurality of sequential samples. The functional unit outputs and stores the first multiplication product and the second multiplication product in different storage locations in at least one storage device.

20 Claims, 6 Drawing Sheets

DUAL-MULTIPLY-ACCUMULATOR OPERATION OPTIMIZED FOR EVEN AND ODD MULTISAMPLE CALCULATIONS

RELATED APPLICATIONS

This application is a continuation of U.S. patent application Ser. No. 12/042,100, filed Mar. 4, 2008 and now U.S. Pat. No. 8,051,121 (issued Nov. 1, 2011); which is a continuation of U.S. patent application Ser. No. 10/826,459, filed Apr. 16, 2004, now U.S. Pat. No. 7,353,244 (issued Apr. 1, 2008), which are both incorporated herein by reference in their entirety.

A portion of the disclosure of this patent document contains material that is subject to copyright protection. The copyright owner has no objection to the facsimile reproduction by anyone of the patent disclosure, as it appears in the Patent and Trademark office patent files or records, but otherwise reserves all copyright rights whatsoever.

BACKGROUND

Description of the Related Art

Digital Signal Processing (DSP) algorithms often utilize multiply-accumulate (MAC) intensive operations. Typical multiple-accumulate operations include multiple steps and utilize extensive resources. First, a full scale negative test is performed where if both a first operand and a second operand are full scale negative values, the result is set to a full scale positive operand. Otherwise, the first and second operands are multiplied together. The product is left shifted by one bit, accumulated with a previous result, and saturated if needed.

The multiple steps required to implement a multiply-accumulate operation often be folded into a single instruction. A typical DSP implementation may include a dual multiply-accumulate unit that provides 16 possible combinations of four loaded operands which are presented to two multipliers. However, some of the most common algorithms only require a few of these possible combinations. Providing multiply-accumulators with such flexibility may be costly in terms of space and instruction coding complexity.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers. and/or memory to transform that electronic data into other electronic data that may be stored in registers and/or memory. A "computing platform" may comprise one or more processors.

Figure 1:
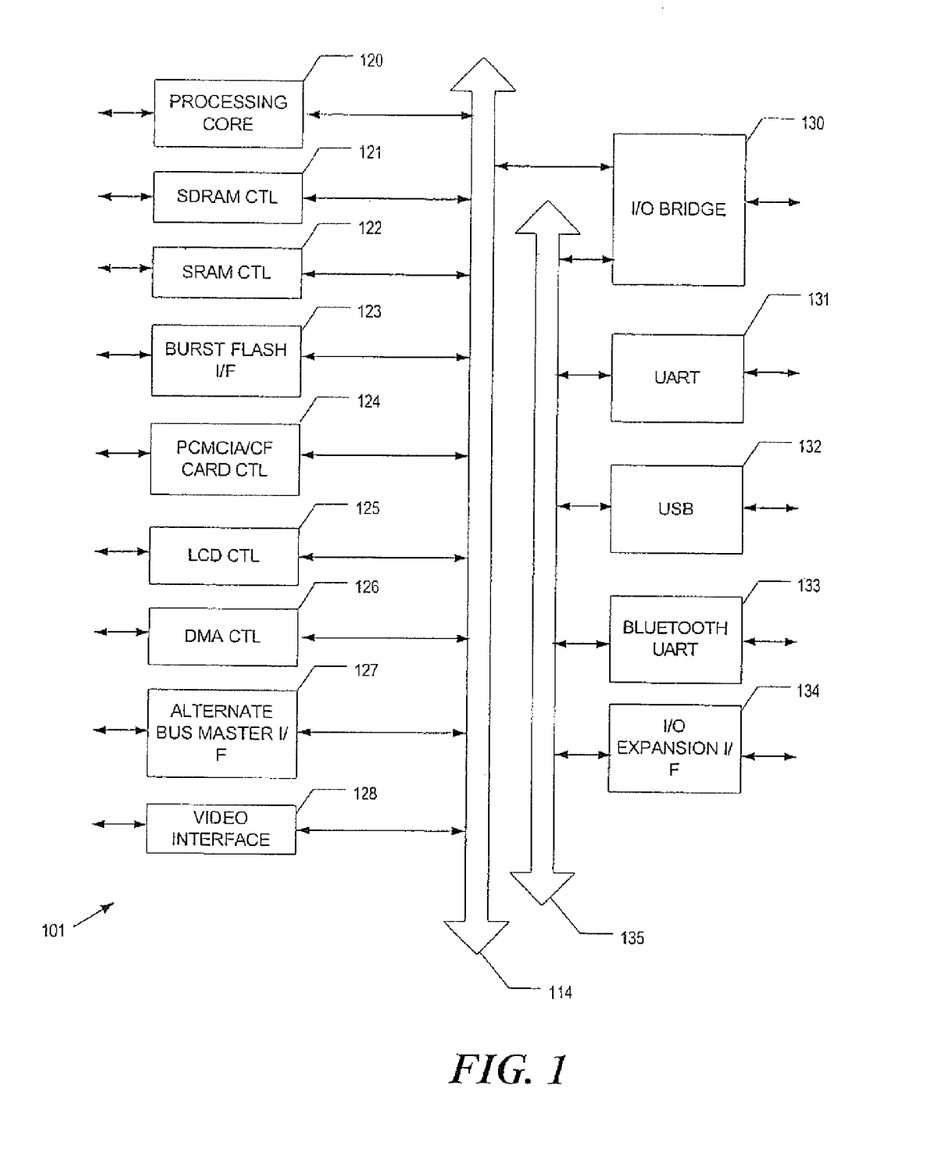
FIG. 1 illustrates a data processing system capable of executing a dual multiply-accumulate operation optimized for even and odd sampling according to an embodiment of the present invention.

FIG. 1 illustrates a data processing system 101 capable of executing a dual multiply-accumulate operation optimized for even and odd sampling according to an embodiment of the present invention. One embodiment of data processing system 101 includes an Intel® Personal Internet Client Architecture (Intel® PCA) applications processor with Intel XScale™ technology.

Data processing system 101 may include a processing core 120 capable of performing Single Instruction Multiple Data (SIMD) operations and, in particular, a dual multiply-accumulate SIMD instruction. Processing core 120 is coupled with a bus 114 for communicating with various other system devices, which may include but are not limited to, for example, a synchronous dynamic random access memory (SDRAM) controller 121, a static random access memory (SRAM) controller 122, a burst flash memory interface 123, a personal computer memory card international association (PCMCIA)/compact flash (CF) card controller 124, a liquid crystal display (LCD) controller 125, a direct memory access (DMA) controller 126, an alternative bus master interface 127, and a video interface 128.

In one embodiment, data processing system 101 may also comprise an I/O bridge 130 for communicating with various I/O devices via an I/O bus 135. Such I/O devices may include but are not limited to, for example, a universal asynchronous receiver/transmitter (UART) 131, a universal serial bus (USB) 132, a Bluetooth wireless UART 133, and an I/O expansion interface 134.

One embodiment of data processing system 101 provides for mobile, network and/or wireless communications and a processing core 120 capable of performing SIMD operations and in particular, a dual multiply-accumulate SIMD instruction. Processing core 120 may be programmed with various audio, video, imaging and communications algorithms. It will be appreciated that these algorithms may include digital signal processing (DSP) building blocks, which may benefit from SIMD operations, such as: convolutions; auto-correlation functions (ACF) or cross-correlation functions (CCF); digital filters such as finite impulse response filters (FIR), adaptive filters (AP) which include, for example, least mean squared (LMS) error algorithms for echo cancellation, or infinite impulse response filters (UR); discrete transformations such as a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 2:
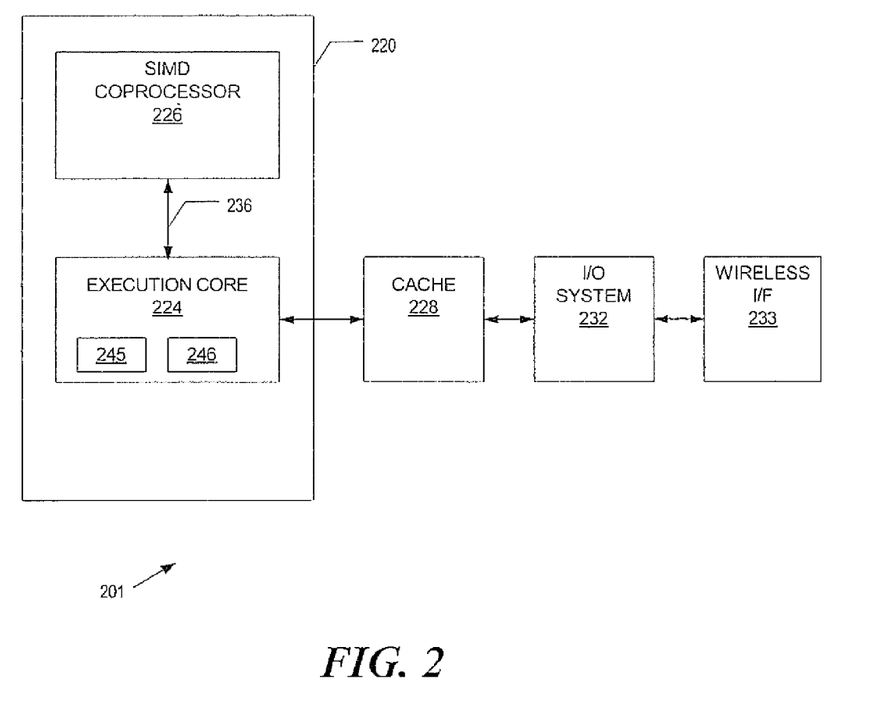
FIG. 2 illustrates an alternative embodiment of a data processing system capable of executing a dual multiply-accumulate operation optimized for even and odd sampling according to an embodiment of the present invention.

FIG. 2 illustrates an alternative embodiment of a data processing system capable of executing a dual multiply-accumulate operation optimized for even and odd sampling SIMD instruction. A data processing system 201 may include a processing core 220 having an execution core 224 and a SIMD coprocessor 226. Processing core 220 may communicate with a cache memory 228 and an input/output system 232. The input/output system 232 may optionally be coupled to a wireless interface 233. SIMD coprocessor 226 is capable of performing SIMD operations, in particular, a dual multiply accumulate SIMD instruction.

In operation, execution core 224 executes a stream of data processing instructions that control data processing operations of a general type including interactions with the cache memory 228, and input/output system 232. Embedded within the stream of data processing instructions are coprocessor instructions. Execution core 224 recognizes these coprocessor instructions as being of a type that should be executed by SIMD coprocessor 226. Accordingly, execution core 224 issues these coprocessor instructions on coprocessor bus 236 from where they are received by any attached coprocessors.

Data may be received via wireless interface 233 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

For one embodiment of processing core 220, instructions may be conditionally executed. Conditionally executed instructions include instructions that have an associated condition that is checked by determining, for example, if flags 245 and 246 match the condition associated with the instruction.

Processing core 120 of FIG. 1 and/or processing core 220 of FIG. 2 may represent central processing units of any type of architecture, including ARM, CISC or RISC type architectures. While one embodiment is described in which the invention is implemented in a single processor computing system, other embodiments of the invention could be implemented in a multi-processor computing system.

Figure 3:
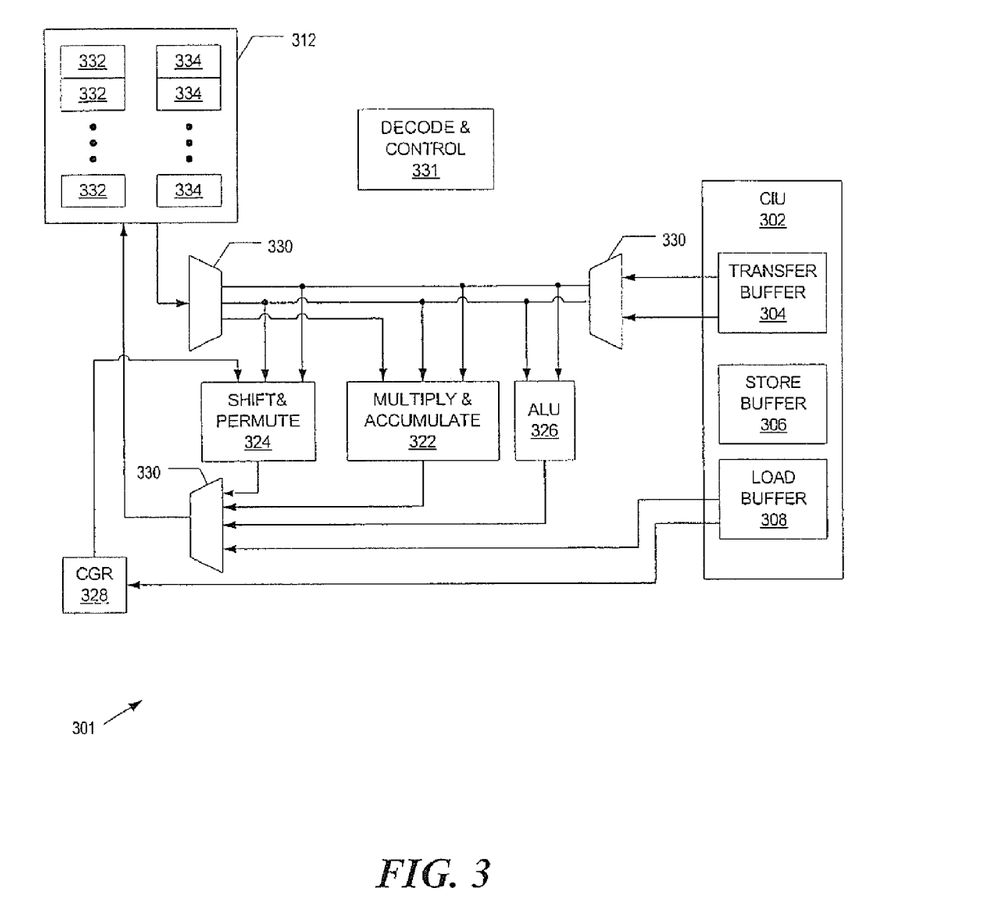
FIG. 3 illustrates a coprocessor capable of executing a dual multiply accumulate operation optimized for even and odd sampling according to an embodiment of the present invention.

FIG. 3 illustrates a SIMD coprocessor capable of executing a dual multiply accumulate operation optimized for even and odd sampling according to an embodiment of the present invention. SIMD coprocessor 301 may include a coprocessor interface unit (CIU) 302 including a transfer buffer 304, a store buffer 306 and a load buffer 308. Transfer buffer 304 may facilitate transfers to and from coprocessor register file 312. In one embodiment, as shown, CIU 302 may detect and/or identify coprocessor instructions intended for SIMD coprocessor 301. CIU 302 facilitates communication between an execution core, for example, execution core 224, and coprocessor 301. CIU 302 additionally communicates with a multiply accumulate unit 322, a shift and permute unit 324, and an arithmetic logic unit (ALU) 326. A control general purpose register (CGR) 328 contains auxiliary registers. A plurality of multiplexers 330 facilitates the data transfer between various units. A decode and control unit 331 controls data transfers and processing. In an alternate embodiment, decode and control unit 331 includes microcode.

Coprocessor register file 312 may include a plurality of registers. One embodiment of coprocessor register file 312 includes sixteen data registers 332 and eight status and control registers 334. In one alternative embodiment of coprocessor register file 312, the data registers 332 include 64 bits of data and status and control registers 334 include 32 bits of data. In another alternative embodiment of coprocessor register file 312, data registers 332 include 128 bits of data providing for wide SIMD operations and status and control registers 334 include 64 or more bits of data.

In one embodiment of coprocessor 301, up to three registers may be assigned for each instruction. For example, up to two source registers and one destination register may be assigned or implicit to an instruction. A primary source register may be designated wRn, a secondary source register may be designated wRm, and a destination register may be designated wRd in accordance with one embodiment of coprocessor 301.

A dual multiply-accumulate instruction may be implemented using the following format:

WQMIA <T,B><T,B> {N} {Cond} wRd, wRn, wRm where T, B, N, and Cond are qualifiers, wRn and wRm are source registers and wRd is a destination register. The wRn and wRm registers are, for example, 64-bit registers used to each store four half-word (16-bit) signed operands. The wRd register is, for example, a 64-bit register used to store two word (32-bit) signed operands. T and B in the X location (first) of the instruction indicate whether the top (T) or bottom (8) signed operands stored in each half (upper and lower) of the wRn registers are operated on. T and B in the Y location (second) indicate whether the top or bottom signed operands stored in each half of the wRm registers are operated on. If T is specified, the top signed operand in each half of the register (upper and lower) are operated on. If B is specified, the bottom signed operand in each half of the register (upper and lower) are operated on. N specifies whether a multiply-negate-accumulate operation is performed instead of a multiply-accumulate operation. Cond is an execution condition. If the condition is not true, then the instruction is not executed.

A dual multiply-accumulate operation may be carried out as follows:
if (Cond specified is true) then {
<operand1>=(T Specified in x position)?wRn[31:16]:wRn [15:0];
<operand2>=(T Specified in y position)?wRm[31:16]:wRm [15:0];

```
<operand3>=(T Specified in x position)?wRn[63:4B]:wRn
    [47:32];
<operand4>=(T Specified in y position)?wRm[63:4B]:wRm
    [47:32];
if (operand 1==OxBOOO && operand 2==OxBOOO)
    tmp 1=Ox7fffffff;
else
    tmp1=(operand1*operand2)<<1;
if (operand3==OxBOOO && operand 4==OxBOOO)
    tmp2=Ox7fffffff;
else
    tmp2=(operand3*operand4)<<1;
if (N specified) then (
    wRd[31:O]=saturate(wRd[31:O]-tmp 1, SS, 32);
    wRd[63:32]=saturate(wRd[63:32]-tmp2, SS, 32);
}
else}
    wRd[31:O]=saturate(wRd[31:O]+tmp 1, SS, 32);
    wRd[63:32]=saturate(wRd[63:32]+tmp2, SS, 32);
}
``` where the function saturate (X, Y, Z) saturates X to the maximum or minimum value, with the output result width specified by Z and Y specifying whether to use the signed or unsigned maximum and minimum values. For signed values the largest possible value may be specified as $(2^{(n-1)}-1)$ and the smallest possible value may be specified as $(-2^{(n-1)})$ where n is the number of bits available.

Figure 4:
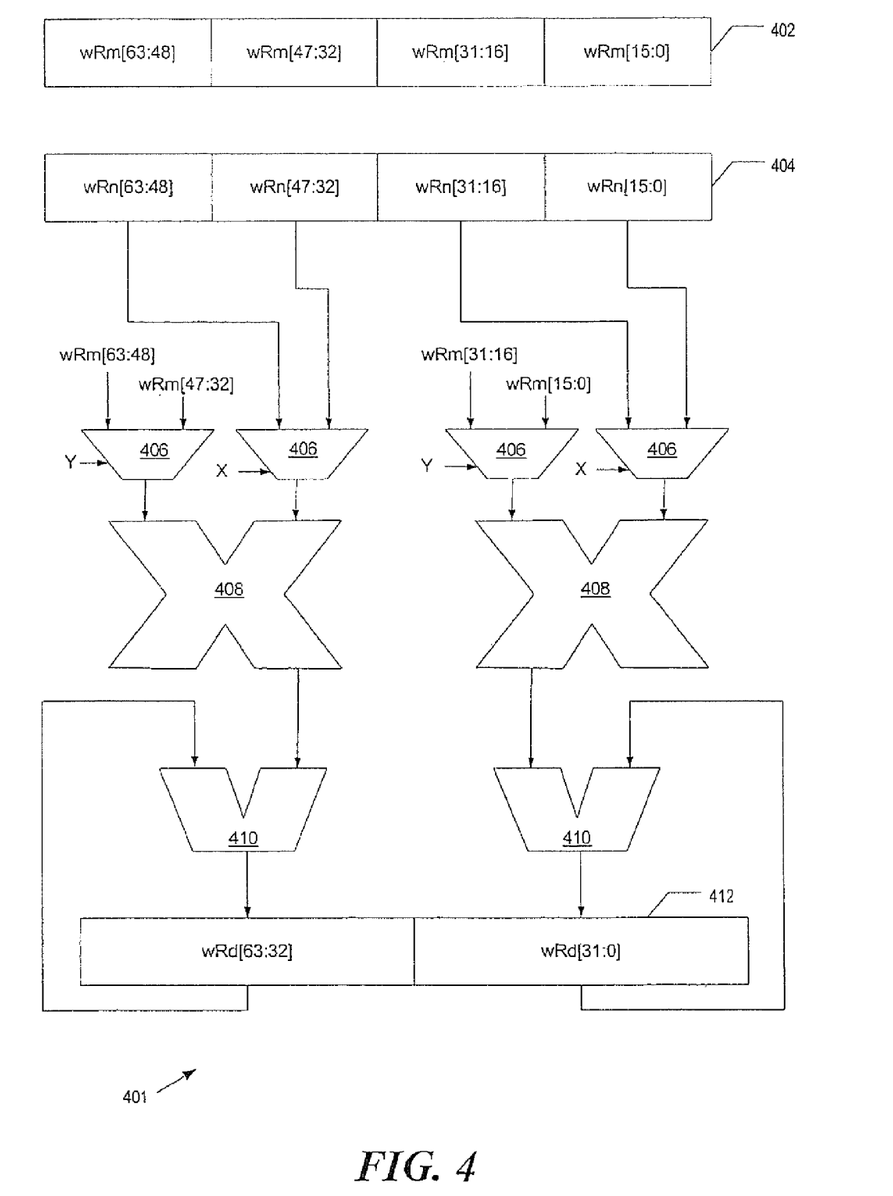
FIG. 4 illustrates a functional unit for performing a dual multiply-accumulate SIMD instruction according to an embodiment of the present invention.

FIG. 4 illustrates a functional unit for performing a dual multiply-accumulate SIMD instruction according to an embodiment of the present invention. The functional unit 401 may be implemented in a processor, for example, processing core 120, processing core 220, SIMD processor 301, a general purpose processor, a digital signal processor (DSP), or an application specific integrated circuit (ASIC) processor. Note for simplicity, the full scale negative test, the left shift, and the saturate operations are not illustrated.

A wRm register 402 may be loaded with four 16-bit signed operands, wRm[63:48], wRm[47:32], wRm[31:16], and wRm[15:0], A wRn register 404 may be loaded with four 16-bit signed operands, wRn[63:48], wRn[47:32], wRn[31:16], and wRn[15:0]. The wRm and wRn operands are routed to four multiplexers 406 and selected according to the qualifiers T and B specified in X and Y locations of the instruction. If T is specified in the X location, operands wRn[63:48] and wRn[31:16] are selected, otherwise operands wRn[47:32] and wRn[15:0] are selected. If T is specified in the Y location, operands wRm[63:48] and wRm[31:16] are selected, otherwise operands wRm[47:32] and wRm[15:0] are selected. The selected wRn operands are multiplied with the selected wRm operands by multipliers 408. The outputs of the multipliers 408 are left shifted by one bit to support fractional arithmetic and sent to accumulators 410. Results of the accumulate operation are stored in wRd register 412 and sent back to an input of accumulators 410. Saturation is provided for each of the two operands in wRd register 412.

In one embodiment of the present invention, the use of registers, adders, multiplexers and other units are controlled by microcode or decode logic and may be used by other instructions. This embodiment allows reuse of existing circuitry providing adders, registers and the like to be efficiently reused by other instructions.

In one embodiment of the present invention, wRm register 402, wRn register 404 and wRd register 412 are each single 64 bit registers. Alternate embodiments may use 32, 128 or other bit widths. Functional unit 401 performs two multiply-accumulate operations. Alternate embodiments may perform 8, 16 or another combination of multiply-accumulate operations.

Functional unit 401 provides two multiply-accumulate operations with limited operand selection, providing a simplified structure that improves ease of coding. The limited operand selection can optimally support most common algorithms by optimizing program sequences and because often only a limited number of operand selection combinations are required. Consider, for example, a Finite Impulse Response (FIR) filter, represented by:

$$y(n) = \sum_{i=0}^{L-1} c_i \cdot x(n-1), v0 \le n \le N-1$$

v0≤n≤N-1

A typical implementation of a T-tap, N sample FIR filter where there are T coefficients and N samples can be represented by the following sequence:
```
for (i=0; i<N; i++)(
    s=0;
    for (j=0; j<T; j++){
        s=L_mac (s, a[j], x[i-j]);
    }
    y[i]=round (s);
}
```

The combinations used for a single calculation with two 32-bit source registers each containing two 16-bit operands each is (T*8, 8*T, T*T, 8*8) supplied to a 16×16 multiplier.

The above sequence can be optimized for functional unit 401, reducing programming overhead and resource utilization. The four combinations can be applied simultaneously to two 16×16 multipliers, each which access the upper and lower 32-bit halves of 64-bit source registers. Because data samples x(n), x(n+1), x(n+2), . . . are organized sequentially in memory, an even/odd sample calculation approach may be performed in parallel, supporting the minimal set of operand selection options. By duplicating coefficients, for example, duplicating a first coefficient in the bottom locations of each half of a source register and duplicating a second coefficient in the top locations of each half of the source register such as wRn=[C(i+1), C(i), C(i+1), C(i)], coefficient load bandwidth and memory use can be decreased. A coefficient may be loaded and broadcast to multiple locations or it may be duplicated in, for example, a main memory. Refer, for example, to the following sequence for an optimized embodiment:
```
for (i=0; i<N; i+=4) (
    s0=ss1=s2=s3=0;
    for U=0; j<r; j++){
    1*Even Samples
    s0=L_mac (s, a[j], x[i-j]);
    s2=L_mac (s, a[j], x[i-j+2]);
    1*Odd samples
    s1=L_mac (s, a[j], x[i-j+1]);
    s3=L_mac (s, a[j], x[i-j+3]);
    }
y[i]=round (s0);
y[i+1]=round (s1);
y[i+2]=round (s2);
y[i+3]=round (s3);
}
```

In the inner loop of the above sequence, four output samples are calculated using adjacent data samples x(n-i), x(n−1+1), x(n−i+2) and x(n−i+3). Optimum assignment of the output samples y(n), y(n+1), y(n+2), and y(n+3) are as even and odd pairs.

FIGS. 5 through 8 illustrate operand selection combinations utilized by a dual multiply-accumulate operation optimized for even and odd multi-sampling according to an embodiment of the present invention.

Figure 5:
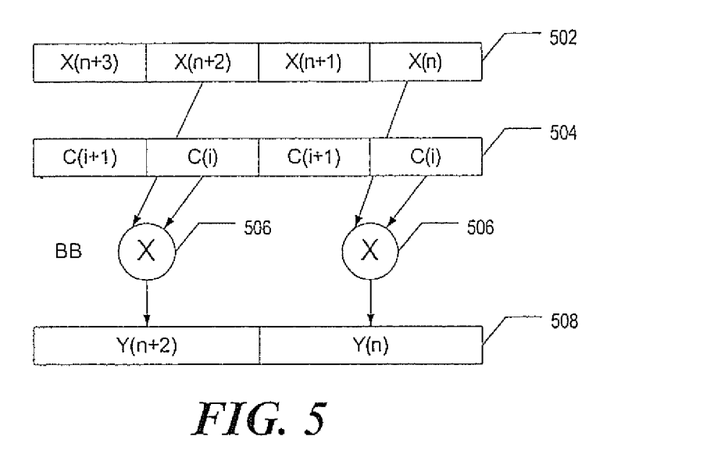
FIGS. 5 through 8 illustrate operand selection combinations utilized by a dual multiply-accumulate operation optimized for even and odd multi-sampling according to an embodiment of the present invention.

FIG. 5 illustrates a bottom-bottom (BB) operand selection combination utilized by a dual multiply-accumulate operation optimized for even and odd multisampling according to an embodiment of the present invention. The bottom operand of each half of a wRm register 502, that is, X(n+2) and X(n), and the bottom operand of each half of a wRn register 504, that is, C(i) and C(i), are selected. The selected operands are multiplied by multipliers 506 and the products Y(n+2) and y(n) are accumulated in a wRd register 508. Note for simplicity, the full scale negative test, the left shift, the accumulate, and the saturate operations are not illustrated.

Figure 6:
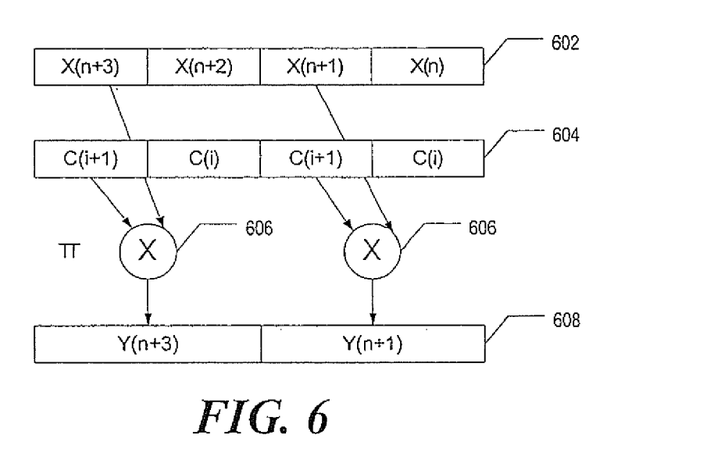

FIG. 6 illustrates a top-top (TT) operand selection combination utilized by a dual multiply-accumulate operation optimized for even and odd multi-sampling according to an embodiment of the present invention. The top operand of each half of a wRm register 602, that is, X(n+3) and X(n+1), and the top operand of each half of a wRn register 604, that is, C(i+1) and C(i+1), are selected. The selected operands are multiplied by multipliers 606 and the products Y(n+3) and Y(n+1) are accumulated in a wRd register 608. Note for simplicity, the full scale negative test, the left shift, the accumulate, and the saturate operations are not illustrated.

Figure 7:
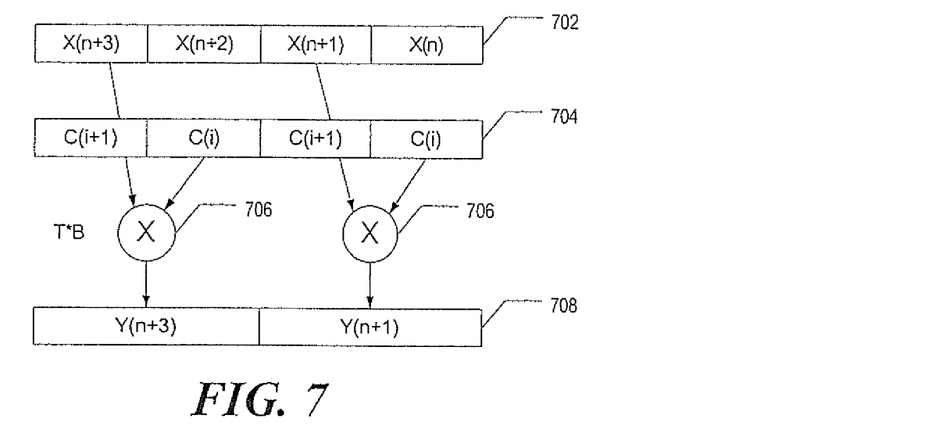

FIG. 7 illustrates a top-bottom (TB) operand selection combination utilized by a dual multiply-accumulate operation optimized for even and odd multi-sampling according to an embodiment of the present invention. The top operand of each half of a wRm register 702, that is, X(n+3) and X(n+1), and the bottom operand of each half of a wRn register 704, that is, C(i) and C(i), are selected. The selected operands are multiplied by multipliers 706 and the products Y(n+3) and Y(n+1) are accumulated in a wRd register 708. Note for simplicity, the full scale negative test, the left shift, the accumulate, and the saturate operations are not illustrated.

Figure 8:
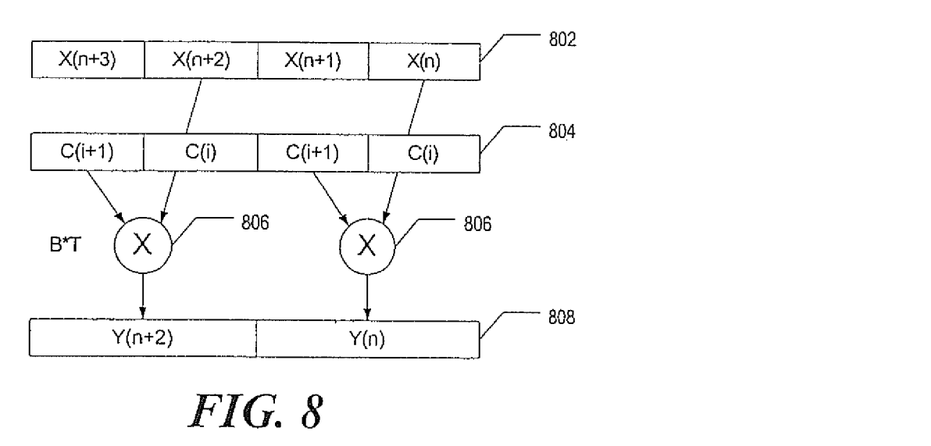

FIG. 8 illustrates a bottom-top (BT) operand selection combination utilized by a dual multiply-accumulate operation optimized for even and odd multi-sampling according to an embodiment of the present invention. The bottom operand of each half of a wRm register 802, that is, X(n+2) and X(n), and the top operand of each half of a wRn register 804, that is, C(i+1) and C(i+1), are selected. The selected operands are multiplied by multipliers 806 and the products Y(n+2) and yen) are accumulated in a wRd register 808. Note for simplicity, the full scale negative test, the left shift, the accumulate, and the saturate operations are not illustrated.

The program listing at the end of this specification illustrates an even and odd multi-sample technique according to an embodiment of the present invention. In this sequence, there are ten coefficients which are preloaded and duplicated in memory (c(i+1), c(i), c(i+1), c(i)). Eight outputs are calculated and accumulated per inner loop iteration, with maximum re-use of the loaded data samples.

The techniques described above may be embodied in a computer-readable medium for configuring a computing system to execute the method. The computer readable media may be permanently, removably or remotely coupled to system 101,201 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via 110 devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Program listing illustrating an even and odd multi-sample technique according to an embodiment of the present invention:

| | | | |
|---|---|---|---|
| Start: | MOV | R3, (DATA_LEN) | @ Data Length N |
| | MOV | R1, (InputAddress) | @ Input Sample Address |
| | MOV | R2, (CoeffAddress) | @ Coefficient Address |
| | MOV | R3, (OutputAddress) | @ Output Sample Address |
| | LORD | wR0, [r2], #8 | @ load c1, c0, c1, c0 |
| | WLDRD | wR1, [r2], #8 | @ load c3, c2, c3, c2 |
| | WLDRD | wR2, [r2], #8 | @ load c5, c4, c5, c4 |
| | WLDRD | wR3, [r2], #8 | @ load c7, c6, c7, c6 |
| | WLDRD | wR4, [r2], #8 | @ load c9, c8, c9, c8 |

-continued

| | | | |
|---|---|---|---|
| | MOV | R6, 0x8000 | @ setup for rounding |
| | MOV | R5, 0x8000 | |
| Loop: | TMCRR | wR15, r5, r6 | @ init y(n + 2), y(n) for rnd |
| | TMCRR | wR14, r5, r6 | @ init y(n + 3), y(n + 1) for rnd |
| | TMCRR | wR13, r5, r6 | @ init y(n + 6), y(n + 4) for rnd |
| | TMCRR | wR12, r5, r6 | @ init y(n + 7), y(n + 5) for rnd |
| | WLDRD | wR5, [R1], #8 | @ Load samples x(n + 3), x(n + 2), x(n + 1), x(n) |
| | WQMIABB | wR15, wR0, wR5 | @ y(n + 2) += c0*x(n + 2), y(n) += c0*x(n) |
| | WQMIATT | wR15, wR0, wR5 | @ y(n + 2) += c1*x(n + 3), y(n) += c1*x(n + 1) |
| | WLDRD | wR6, [R1], #8 | @ Loadx(n + 7), x(n + 6), x(n + 5), x(n + 4) |
| | WALIGNI | wR7, wR6, wR5, #4 | @ alignx(n + 5, x(n + 4), x(n + 3), x(n + 2) |
| | WQMIATB | wR14, wR5, wR0 | @ y(n + 3) += c0*x(n + 3), y(n + 1) += c0*x(n + 1) |
| | WQMIABT | wR14, wR7, wR5 | @ y(n + 3) += c1*x(n + 4), y(n+1) += c1*x(n + 2) |
| | WQMIATB | wR14, wR7, wR1 | @ y(n + 3) += c2*x(n + 5), y(n+1) += c2*x(n + 3) |
| | WQMIABT | wR14, wR6, wR1 | @ y(n + 3) += c3*x(n + 6), y(n+1) += c3*x(n + 4) |
| | WQMIATB | wR14, wR6, wR2 | @ y(n + 3) += c4*x(n + 7), y(n+1) += c3*x(n + 5) |
| | WQMIABB | wR15, wR7, wR1 | @ y(n + 2) += c2*x(n + 4), y(n) += c2*x(n + 2) |
| | WQMIATT | wR15, wR7, wR1 | @ y(n + 2) += c3*x(n + 5), y(n) += c3*x(n + 3) |
| | WQMIABB | wR15, wR6, wR2 | @ y(n + 2) += c4*x(n + 6), y(n) += c4*x(n + 4) |
| | WQMIATT | wR15, wR6, wR2 | @ y(n + 2) += c5*x(n + 7), y(n) += c5*x(n + 5) |
| | WQMIABB | wR13, wR6, wR0 | @ y(n + 6) += c0*x(n + 6), y(n + 4) += c0*x(n + 4) |
| | WQMIATT | wR13, wR6, wR0 | @ y(n + 6) += c1*x(n + 7), y(n + 4) += c1*x(n + 5) |
| | WQMIATB | wR12, wR6, wR0 | @ y(n + 7) += c0*x(n + 7), y(n + 5) += c0*x(n + 5) |
| | WLDRD | wR5, [R1], #8 | @ Loadx(n + 11), x(n + 10), x(n + 9), x(n + 8) |
| | WALIGNI | wR7, wR5, wR6, #4 | @ align x(n + 9), x(n + 8), x(n + 7), x(n + 6) |
| | WQMIABT | wR12, wR7, wR0 | @ y(n + 7) + c1*x(n + 8), y(n + 5) += c1*x(n + 6) |
| | WQMIABB | wR15, wR7, wR3 | @ y(n + 2) -:- c6*x(n + 8), y(n) += c6*x(n + 6) |
| | WQMIATT | wR15, wR7, wR3 | @ y(n + 2) += c7*x(n + 9), y(n) += c7*x(n + 7) |
| | WQMIABB | wR15, wR5, wR4 | @ y(n + 2) += c8*x(n + 10), y(n) += c6*x(n + 8) |
| | WOMIATT | wR15, wR5, wR4 | @ y(n + 2) += c9*x(n + 11), y(n) += c7*x(n + 9) |
| | WOMIABT | wR14, wR7, wR2 | @y(n + 3) += c5*x(n + 8), y(n + 1 ) += c5*x(n + 6) |
| | WOMIATB | wR14, wR7, wR3 | @y(n + 3) += c6*x(n + 9), y(n + 1 ) += c6*x(n + 7) |
| | WOMIABT | wR14, wR5, wR3 | @y(n + 3) += c7*x(n + 10), y(n + 1) += c7*x(n + 8) |
| | WOMIABB | wR14, wR5, wR4 | @y(n + 3) += c8*x(n + 11), y(n + 1) += c8*x(n + 9) |
| | WOMIABB | wR13, wR7, wR1 | @y(n + 6) += c2*x(n + 8), y(n + 4) += c2*x(n + 6) |
| | WOMIATT | wR13, wR7, wR1 | @y(n + 6) += c3*x(n + 9), y(n + 4) += c3*x(n + 7) |
| | WOMIABB | wR13, wR5; wR2 | @y(n + 6) += c4*x(n + 10), y(n + 4) += c4*x(n + 8) |
| | WOMIATT | wR13, wR5, wR2 | @y(n + 6) += c5*x(n + 11), y(n + 4) += c5*x(n + 9) |
| | WOMIABB | wR12, wR7, wR1 | @y(n + 7) += c2*x(n + 8), y(n + 5) += c2*x(n + 6) |
| | WOMIATT | wR12, wR7, wR1 | @y(n + 7) += c3*x(n + 9), y(n + 5) += c3*x(ti + 7) |
| | WOMIABB | wR12, wR5, wR2 | @y(n + 7) += c4*x(n + 10), y(n + 5) += c4*x(n + 8) |
| | WOMIATT | wR12, wR5, wR2 | @y(n + 7) += c5*x(n + 11), y(n + 5) += c5*x(n + 9) |
| | WLDRD | wR6, [R1], #8 | @Load x(n + 15), x(n + 14), x(n + 13), x(n + 12) |
| | WALIGNI | wR7, wR6, wR5, #4 | @align x(n + 13), x(n + 12), x(n + 11), x(n + 10) |
| | WOMIABT | wR14, wR5, wR4 | @y(n + 3) += c9*x(n + 12), y(n + 1) += c9*x(n + 10) |
| | WOMIABB | wR13, wR7, wR3 | @y(n + 6) += c6*x(n + 12), y(n + 4) += c6*x(n + 10) |
| | WOMIATT | wR13, wR7, wR3 | @y(n + 6) += c7*x(n + 13), y(n + 4) += c7*x(n + 11) |
| | WOMIABB | wR13. wR6, wR4 | @y(n + 6) += c8*x(n + 14), y(n + 4) += c8*x(n + 12) |
| | WOMIATT | wR13, wR6, wR4 | @y(n + 6) += c9*x(n + 15), y(n + 4) += c9*x(n + 13) |
| | WOMIABB | wR12, wR7, wR3 | @y(n + 7) += c6*x(n + 12), y(n + 5) += c6*x(n + 10) |
| | WOMIATT | wR12, wR7, wR3 | @y(n + 7) += c7*x(n + 13), y(n + 5) += c7*x(n + 11) |
| | WOMIABB | wR12, wR6, wR4 | @y(n + 7) += c8*x(n + 14), y(n + 5) += c8*x(n + 12) |
| | WOMIATT | wR12, wR6, wR4 | @y(n + 7) += c9*x(n + 15), y(n + 5) += c9*x(n + 15) |
| | @*** | | |
| | @*** Pack and store 8 output samples | | |
| | @*** | | |
| | WSUBS | | |
| | BNE | LOOP | |

What is claimed is:

1. A device comprising:
a functional unit configured to calculate, in parallel:
a first multiplication product of a first coefficient and a first sample; and
a second multiplication product of the first coefficient and a second sample;
wherein the first sample is an (n)th sample and the second sample is an (n+2)th sample in a plurality of sequential samples; and
wherein the functional unit is configured to output and store the first multiplication product and the second multiplication product in different storage locations in at least one storage device.

2. The device as recited in claim 1, further comprising at least one non-transitory computer readable medium that includes stored instructions that when executed cause the functional unit to calculate the first multiplication product and the second multiplication product.

3. The device as recited in claim 1, wherein the functional unit is further configured to accumulate subsequent multiplication products with the first multiplication product into a final product.

4. The device as recited in claim 3, wherein the functional unit is further configured to saturate the final product.

5. The device as recited in claim 1, wherein the functional unit is configured to receive the plurality of sequential samples from one or more registers, and wherein the first sample and the second sample are odd samples in the plurality of sequential samples.

6. The device as recited in claim 1, wherein the functional unit is configured to receive the plurality of sequential samples from one or more registers, and wherein the first sample and the second sample are even samples in the plurality of sequential samples.

7. The device as recited in claim 1, wherein the functional unit is further configured to calculate, in parallel:
a third multiplication product of a second coefficient and a third sample; and
a fourth multiplication product of the second coefficient and a fourth sample;
wherein the third sample is an (n+1)th sample and the fourth sample is an (n+3)th sample in the plurality of sequential samples.

8. The device as recited in claim 1, wherein the functional unit is further configured to calculate, in parallel:
a fifth multiplication product of a second coefficient and the first sample; and
a sixth multiplication product of the second coefficient and the second sample generating a sixth product, and
wherein the functional unit is configured to accumulate in parallel:
the fifth multiplication product with the first multiplication product; and
the sixth multiplication product with the second multiplication product.

9. The device as recited in claim 1, wherein the first coefficient and the second coefficient are filter coefficients.

10. The device as recited in claim 1, wherein the functional unit is configured to perform the calculation by executing a multiply accumulate single-instruction-multiple-data (SIMD) instruction.

11. An apparatus comprising:
a processing circuit configured to calculate a finite impulse response (FIR), including executing, in parallel:
a first multiply accumulate operation of a first sample with a first coefficient; and
a second multiply accumulate operation of a second sample with the first coefficient;
wherein the first sample is an (n)th sample and the second sample is an (n+2)th sample in a plurality of sequential samples; and
wherein the processing circuit is configured to produce a signal based on the first multiply accumulate operation and to store the signal in a first location in a storage device and to produce a second signal based on the second multiply accumulate operation and to store the second signal in a second location in the storage device.

12. The apparatus as recited in claim 11, wherein the processing circuit is configured to calculate the finite impulse response (FIR) by:
selecting the first sample in a first location of an upper half of a first register and selecting the second sample in a corresponding location of a lower half of the first register;
selecting a first operand in a first location of an upper half of a second register and selecting a second operand in a corresponding location of a lower half of the second register, wherein the first operand and the second operand are each the first coefficient;
multiplying the first sample and the first operand and accumulating a first result in a lower half of a third register; and
multiplying the second sample and the second operand accumulating a second result in an upper half of the third register.

13. The apparatus as recited in claim 12, wherein the first location and the corresponding location of the first register are one of upper bits of each half of the first register and lower bits of each half of the first register.

14. The apparatus as recited in claim 11, wherein the apparatus includes a non-transitory computer-readable medium that includes stored microcode configured to control the processing circuit to calculate the finite impulse response (FIR).

15. The apparatus as recited in claim 11, wherein the first coefficient is a filter coefficient.

16. The apparatus as recited in claim 11, wherein the executing in parallel comprises executing a multiply accumulate single-instruction/multiple-data (SIMD) instruction.

17. An apparatus comprising:
means for calculating, in parallel:
a first multiplication product of a first coefficient and a first sample; and
a second multiplication product of the first coefficient and a second sample;
wherein the first sample is an (n)th sample and the second sample is an (n+2)th sample in a plurality of sequential samples;
means for calculating, in parallel:
a third multiplication product of a second coefficient and a third sample; and
a fourth multiplication product of the second coefficient and a fourth sample;
wherein the third sample is an (n+1)th sample and the fourth sample is an (n+3)th sample in the plurality of sequential samples; and
means for forming a signal based on the first multiplication product, the second multiplication product, the third multiplication product and the fourth multiplication product.

18. The apparatus as recited in claim 17, wherein the first sample and the second sample are odd samples in the plurality of sequential samples stored in one or more registers or are even samples in the plurality of sequential samples.

19. The apparatus as recited in claim 17, wherein the first coefficient and the second coefficient are filter coefficients.

20. The apparatus as recited in claim 17, further comprising a coprocessor configured to execute a multiply accumulate single-instruction-multiple-data (SIMD) instruction that controls the means for calculating the first multiplication product and the second multiplication product.

* * * * *